US012000655B2

(12) United States Patent
Schultheis

(10) Patent No.: US 12,000,655 B2
(45) Date of Patent: Jun. 4, 2024

(54) ROTARY TUBE APPARATUS

(71) Applicant: GRENZEBACH BSH GMBH, Bad Hersfeld (DE)

(72) Inventor: Niclas Schultheis, Bad Hersfeld (DE)

(73) Assignee: GRENZEBACH BSH GMBH, Bad Hersfeld (DE)

( * ) Notice: Subject to any disclaimer, the term of this patent is extended or adjusted under 35 U.S.C. 154(b) by 708 days.

(21) Appl. No.: 17/054,873

(22) PCT Filed: May 10, 2019

(86) PCT No.: PCT/EP2019/000140
§ 371 (c)(1),
(2) Date: Nov. 12, 2020

(87) PCT Pub. No.: WO2019/219233
PCT Pub. Date: Nov. 21, 2019

(65) Prior Publication Data

US 2021/0215428 A1 Jul. 15, 2021

(30) Foreign Application Priority Data

May 14, 2018 (DE) ......................... 102018003840.9

(51) Int. Cl.

| | |
|---|---|
| ***F27B 7/16*** | (2006.01) |
| ***F27B 7/40*** | (2006.01) |
| ***F27D 15/02*** | (2006.01) |
| ***F28D 11/04*** | (2006.01) |
| *F27D 9/00* | (2006.01) |

(52) U.S. Cl.
CPC .............. *F27D 15/028* (2013.01); *F27B 7/40* (2013.01); *F28D 11/04* (2013.01); *F27D 2009/0051* (2013.01); *F27D 2009/0078* (2013.01)

(58) Field of Classification Search
CPC ....... C21B 11/06; C21B 13/08; C21D 9/0031; C21D 9/0037; C22B 1/216; F23G 5/20; F23G 2203/20; F23G 2900/52002; F23G 5/22; F23G 2900/52003; F27B 7/00; F27B 7/14; F27B 7/16; F27B 7/161; F27B 7/162; F27D 15/028; C03B 5/0277; C03B 5/0338; C03B 5/14
See application file for complete search history.

(56) References Cited

U.S. PATENT DOCUMENTS 1,218,873 A 3/1917 Lennon
1,544,504 A * 6/1925 Tomlinson .............. F27B 7/162
432/118
2,283,129 A 5/1942 Roubal
2,348,446 A 5/1944 Becker
2,362,539 A 11/1944 Cheesman
(Continued)

FOREIGN PATENT DOCUMENTS

CN 113249539 A * 8/2021 ............. C21B 13/08
CN 113970105 A * 1/2022
(Continued)

*Primary Examiner* — Gregory A Wilson
(74) *Attorney, Agent, or Firm* — Abel Schillinger, LLP

(57) ABSTRACT

A rotary tube apparatus for cooling or heating flowable granular bulk materials, in particular a sectional cooler (8) for cooling a flowable granular solid material, with structures mounted on its walls for increasing the thermal conduction, characterized in that the structures include hollow tubes (10).

11 Claims, 8 Drawing Sheets

(56) References Cited

U.S. PATENT DOCUMENTS

| | | | | | |
|---|---|---|---|---|---|
| 2,707,629 | A | * | 5/1955 | Kennedy | C21D 9/0031 432/112 |
| 3,272,489 | A | * | 9/1966 | Heyer | D04H 1/54 29/890.048 |
| 3,829,282 | A | | 8/1974 | Deussner | |
| 3,920,381 | A | | 11/1975 | Heinemann | |
| 4,021,195 | A | | 5/1977 | Sylvest | |
| 4,089,634 | A | | 5/1978 | Sylvest | |
| 4,131,418 | A | | 12/1978 | Kramm et al. | |
| 4,557,804 | A | | 12/1985 | Baugartner et al. | |
| 4,637,034 | A | | 1/1987 | Grageda | |
| 4,711,297 | A | | 12/1987 | Haacker et al. | |
| 5,393,225 | A | | 2/1995 | Freiberger et al. | |
| 7,458,325 | B1 | * | 12/2008 | Hopper | F23G 5/20 34/169 |
| 9,395,119 | B2 | * | 7/2016 | Sanz Garcia | F27B 7/34 |
| 2021/0215428 | A1 | * | 7/2021 | Schultheis | F28D 11/04 |

FOREIGN PATENT DOCUMENTS

| | | | | | |
|---|---|---|---|---|---|
| DE | 160351 | C1 | | 5/1905 | |
| DE | 3331744 | C2 | | 5/1984 | |
| DE | 3534991 | A1 | | 4/1987 | |
| DE | 3731950 | A1 | * | 4/1989 | |
| DE | 4406382 | C2 | | 8/1995 | |
| EP | 0217113 | A2 | | 4/1987 | |
| EP | 0567467 | B1 | | 11/1993 | |
| EP | 2889569 | A1 | | 7/2015 | |
| JP | 2007309622 | A | | 11/2007 | |
| JP | 2009127946 | A | * | 6/2009 | |
| JP | 2018135451 | A | | 8/2018 | |
| RU | 2035683 | C1 | | 5/1995 | |
| RU | 2508389 | C1 | | 2/2014 | |
| RU | 2629281 | C1 | | 8/2017 | |
| SU | 1545069 | A1 | | 2/1990 | |
| SU | 1737241 | A1 | | 5/1992 | |
| WO | WO-2008095410 | A1 | * | 8/2008 | F23G 5/20 |

* cited by examiner

ROTARY TUBE APPARATUS

BACKGROUND OF THE INVENTION

1. Field of the Invention

The invention relates to a rotary tube apparatus, in particular a sectional cooler for cooling a flowable granular solid, with structures mounted on its walls for increasing heat conduction in accordance with the preamble of claim 1. The purpose of a rotary tube apparatus is the cooling or heating of a flowable granular material, in particular a granular bulk material. Rotary tube apparatuses are employed, in particular in the form of a sectional cooler, for continuous processes in process engineering.

2. Discussion of Background Information

Different devices and methods are known in the prior art for the cooling of very hot products. In different industrial sectors such as, in particular, in metallurgy, the chemical industry, the building materials and cement industry as well as in the recycling industry, coolers are required for the cooling of very hot products such as, for example, fired pigments, slags, metal oxides and hydroxides, cement clinker, iron sponge, scale, activated carbon, catalysts, coke, metallurgical residual products, etc. Without a cooling of the very hot products, a further processing is often not possible. In many cases, the thermal energy contained in the solid is to be at least partially recovered within the framework of the technologically required cooling.

There thus exist different technologies, i.e. devices and methods for cooling such granular bulk materials that have to be cooled from an initial temperature of, e.g., 700° C. to 1,400° C. to final temperatures of, e.g., 80° C. to 200° C.

In addition to the use of coolers using a direct contact of surrounding air with the material to be cooled, rotary coolers operating indirectly with air or with water are also used for this task. "Indirectly" means that the cooling medium, for example water or air, does not come into direct contact with the hot product to be cooled, but that a heat transfer occurs from the hot product to the cooling medium via an apparatus wall separating the media.

Solid material coolers operating indirectly with air that work both with a single, closed drum housing as well as such coolers that convey the solid material in a plurality of tubes inside a drum are disclosed in U.S. Pat. No. 1,218,873 A, 2,283,129 A and 2,348,446 A.

Moreover, introducing hot granular bulk material such as, for example, hot clinker to be cooled, as produced in the cement industry, into a plurality of tubes arranged around an outlet end of a rotary kiln and conveying the same by rotating the kiln and thus the cooling tubes is known from DE 44 06 382 C2, DE 33 31 744 C2, U.S. Pat. No. 3,829,282 A, 3,920,381 A; 4,021,195 A; 4,089,634 A and 4,131,418 A. In these kinds of coolers, the cooling of the cooling tubes conveying the hot product occurs by natural convection of the surrounding air.

In the simplest designs of rotary coolers cooled indirectly with water, a rotary tube is sprayed from the outside with water; or the drum moves through a water bath, as described in U.S. Pat. No. 4,557,804 A, whereby the surface of the rotating drum is bathed in water and the apparatus wall is cooled while the hot product present in the drum is in turn cooled by heat exchange with the cooled apparatus wall.

EP 0 567 467 B1 discloses a rotary cooler with a rotary tube which turns inside a stationary, circumferential jacket and in which the cooling medium, for example air or water, flows in the space formed between the rotary tube and the outer jacket.

A similar solution, in which the drum jacket is constituted by a tube system through which cooling water flows, is disclosed in U.S. Pat. No. 1,711,297 A; 4,711,297 A, EP 0 217 113 A2 and DE 35 34 991 A1. Such a simple drum design necessarily possesses a small surface for the heat exchange, which leads to a reduced cooling performance of the apparatus. U.S. Pat. No. 2,362,539 A describes a cooler that works with a plurality of circularly-arranged, product-conveying tubes, wherein the tubes are sprayed from above with water and the water runs into a trough underneath.

In the case of sectional coolers as they have become known through Grenzebach BSH GmbH, a plurality of chambers, for example six or eight chambers, the so-called sections, are provided in a rotary drum housing to increase the surface area for the heat exchange, whereby a gap is created between the chambers. In relation to the cross-section of a cylindrical housing, each chamber thus fills a sector of the circle or circular cross-section.

For the cooling of the hot product present in or conveyed through the chambers (sections), cooling water is conducted through the gaps formed in the drum housing between the sections. The in- and outlet of the cooling water occurs via a sealed rotary joint on the product-discharge side of the drum as well as tube connections to and from the individual double tubes.

Such sectional coolers have a special design, which leads to significant expenditure in terms of materials and work invested in their manufacture, specifically due to the extensive welding work required. Moreover, the drum housing necessarily has a large weight as the drum and the walls of the chambers have to be realized with thick walls for reasons of strength. Although these factors lead to a high overall weight of the apparatus, they also permit a particularly effective heat exchange.

Sectional coolers essentially consist of a rotating rotor, which is usually driven via a chain. Fixed housings are located at the ends of the rotor for the in- and outlet of product. Depending on the size of the cooler, the rotor is either mounted at the ends of its own shaft (shaft cooler) or possesses a roller-bearing mount typical of rotary kilns. The interior of the rotor consists of a plurality of section-shaped chambers arranged in the manner of pieces of cake around a central hollow shaft. This arrangement is completely surrounded by an outer jacket. Conveying elements are provided in the section-shaped chambers. These can be shovel blades, chains or the like, depending on requirements.

Sectional coolers are built with diameters between 0.8 and 4 m and lengths of 3 to 30 m, depending on requirements.

Sectional coolers work with an indirect water cooling. The cooling water enters the space between the individual sections through an internal central hollow shaft, circulates between and around the sections and leaves through an external central hollow shaft. The product to be cooled typically falls directly into the product feed housing and is transported by the rotational movement and the conveying elements to the other end of the cooler. By means of the rotation, a permanent mixing of the product in the sections and thus a good heat transfer is achieved. The product can be conveyed in a flow parallel to or opposite that of the cooling medium.

Sectional coolers can be used for the cooling of almost all flowable granular bulk materials. They can often be found behind rotary kilns in calcination processes or the like. Their main purpose is usually to cool the products to an extent that the latter can be handled with other apparatus (conveyors, mills, etc.). Often the cooling itself is an important part in the production process. Typical products are, e.g., petroleum coke, zinc calcine, soda ash, pigments and more. The entry temperatures of the products can reach up to 1400° C.

In contrast to apparatus cooled directly by air, problems caused by product discharge in the air flow do not occur in sectional coolers when cooling powders. Due to its robust design, larger particles do not cause any problems either. By using corresponding seals, it is possible to create an inert space in the sections so that reactive products can also be handled.

It is the object of the invention to improve a rotary tube apparatus, in particular a sectional cooler, of the aforementioned type so as to achieve an optimized heat transfer from the material to be cooled to the cooling medium.

SUMMARY OF THE INVENTION

This object is achieved in accordance with the invention as indicated in claim 1.

Further advantageous embodiments are indicated in the dependent claims and the description, in particular in conjunction with the figures.

The invention relates to any rotary tube apparatus used for the cooling or heating of a flowable granular material. Reference is made in the following to a rotary cooler and its cooling function as an example of such a rotary tube apparatus; the invention is nevertheless provided for use with any pourable granular material introduced into such a rotary cooler. The hollow tubes are preferably arranged in rows extending in the longitudinal direction of the rotary tube apparatus.

Advantageously, two adjacent rows of hollow tubes respectively have an offset arrangement of their hollow tubes.

The hollow tubes can be mounted on the walls of sections, for example, by means of screws, adhesive bonding or rivets.

Welding methods, for example, are also suitable, in particular submerged arc welding, metal inert gas welding, friction welding or stud welding. A method particularly adapted to the hollow tubes and thus particularly suitable is MARC welding.

The hollow tubes have a length of less than 10 cm, in particular less than 5 cm. They particularly preferably have a length of 3.6 cm.

The hollow tubes advantageously have a diameter of less than 5 cm, in particular of 3.0 cm.

It has also proven advantageous for the hollow tubes to have a wall thickness of 1 cm or less, in particular of 0.5 cm.

The rotary cooler preferably has a plurality of sections, which have a greater density of hollow tubes on the radial walls and on the peripheral wall than in the corner areas between the radial walls and between the radial walls on the one hand and the peripheral wall on the other.

It is advantageously provided that the sections respectively have approximately 500 ribs or 500 hollow tubes per metre of length of the rotary cooler.

The invention also relates to a method for operating a rotary tube apparatus, in particular a rotary cooler, as described in the foregoing. The method is characterized in that the solid material moves around the hollow tubes in a turbulent flow.

BRIEF DESCRIPTION OF THE DRAWINGS

The invention is illustrated in greater detail below in embodiment examples with the aid of the drawings. The drawings show.

DETAILED DESCRIPTION OF EMBODIMENTS OF THE INVENTION

In accordance with the invention, a plurality of criteria are considered when optimizing a rotary cooler. The best possible combination of material, joining process and geometry is determined. The optimization of the heat transfer of the rotary cooler, in particular of the sectional cooler, is primarily improved, however, by means of the implementation and optimization of the cooling ribs.

The substrate to be cooled is introduced at a high temperature, for example potentially reaching 950° C., into a rotary cooler, for example into a sectional cooler. By means of the continuous cooling of the sections by means of a cooling fluid, for example water, the temperatures of the sections are lowered. Depending on their geometry, cooling ribs in the sections at the area of entry of the product can still reach a temperature of, for example, 550° C. The mechanical stresses on the ribs, however, are low. They are limited to stresses caused by the contact with the product. The ribs do not play any supporting or strengthening roll inside the sectional cooler. Materials with working limits below 550° C. can thus also be considered. The main stress encountered is the resistance to wear caused by the substrate to be cooled or heated, for example zinc oxide in powder form. Depending on the composition of the atmosphere inside the sectional cooler, high-temperature corrosion processes can also occur.

In light of the occurring temperatures, the selection of materials is limited to metals and their alloys as well as ceramic materials. In spite of their good characteristics with respect to corrosion resistance, ceramic materials possess poor thermal conductivity. Moreover, their brittle behaviour is to be viewed critically. Metal alloys are consequently preferred in this selection of materials. The viable materials for selection are depicted with a few of their characteristics in Table 1. It is evident from the selection that materials of respectively different categories have been included in the selection process. For example, the sectional cooler with all of its mounted components consists predominantly of the structural steel S235JR with the material identification number 1.0038. However, other alloys, for example of aluminium or magnesium, as well as different steel types are also suitable.

Table 1 shows the materials.

The selection of the material to be used is carried out based on a plurality of criteria.

As the main stress on the cooling ribs is the wear caused by the zinc oxide, this wear is to be kept to a minimum. The types of wear occurring here are sliding wear and impact wear. A high resistance vis-à-vis these two types, which are composed of the mechanisms of abrasion and surface breakdown, can be realized by a combination of high hardness and ductility. The mechanism of abrasion can be countered by a high hardness of the material.

Figure 1:
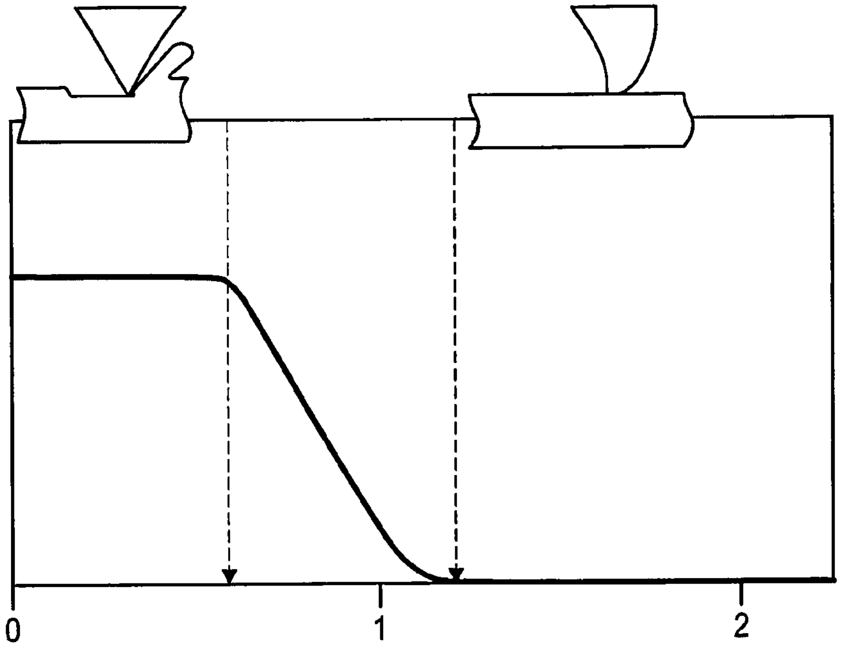
FIG. 1 a depiction of the wear of a component (vertical axis), for example of the rotary tube apparatus, as a function of the ratio of the hardness of the material of the component to the hardness of a wearing body (horizontal axis), for example of zinc oxide, FIG. 2 a depiction of the wear of a component (vertical axis), for example of the rotary tube apparatus, as a function of the ratio of the hardness of the material of the component to the hardness of zinc oxide (horizontal axis) for different materials suitable for use in a rotary tube apparatus, FIG. 3 a depiction of the Brinell hardness [HBW] (vertical axis) as function of elongation at break, measured in [%], for different materials suitable for use in a rotary tube apparatus (horizontal axis), in particular for its components which perform a cooling function such as the cooling ribs, FIG. 4 a depiction of the thermal conductivity Λ, measured in [W/(m K)], (vertical axis) of different materials as a function of the difference between the thermal expansion coefficient of these materials and the thermal expansion coefficient $\alpha$ [$10^{-6}$ $K^{-1}$] of the structural steel IS235JR used for the walls of the sections of the rotary tube apparatus (horizontal axis), FIG. 5 the heat flow Q [W] (vertical axis) transferred by different materials as a function of their thermal conductivity $\lambda$ [W/(m K)] (horizontal axis), FIG. 6 the thermal conductivity of different materials (vertical axis) as a function of their thermal diffusivity (horizontal axis), FIG. 7 a sectional view of a segment of a section of a sectional cooler with an L-shaped rib connected to a wall of the section by a screw and a nut, FIG. 8 a sectional view of a segment of a section of a sectional cooler with a wave-shaped rib in cross-section, FIG. 9 a sectional view of a hollow rib or tube rib mounted on a wall of a section of a sectional cooler, FIG. 10 a cross-section through a schematically depicted sectional cooler with eight sections, which are respectively partially filled with a flowable granular material (depicted in black), FIG. 11 an isometric cross-sectional depiction of a sector of a sectional cooler according to FIG. 10, which is equipped with hollow ribs according to FIG. 9 arranged in the shape of rows, FIG. 12 a top view of tube ribs arranged in the shape of rows on an inner wall of a sector of the sectional cooler in the area of one of the zones in which the material to be cooled has a higher particle speed, and FIG. 13 a depiction of a tube rib surrounded by a flow of particles of a material to be cooled.

As depicted schematically in FIG. 1 by the ratio of the hardness of the component to the hardness of the wearing body, the wear by abrasion is divided into three zones. In the zone with a ratio under 0.6, the greatest wear occurs as a result of the low hardness of the component. In an area with a ratio of the hardness of the two components between 0.6 and 1.2, a transition from a high level of wear to a low level of wear takes place. As of a value of 1.2, the wear by abrasion is reduced to a minimum, as the wearing body, due to its low hardness, is unable to penetrate the component.

TABLE 1

| Category | Abbreviated name | Material ID no. | Thermal conductivity [W/(mK)] | Expansion coefficient [*10^−6K^−1] | Specific thermal capacity [J/(kg)] | E-module [N/mm$^2$] | Density [kg/m$^3$] | Brinell Hardness [HBW] |
|---|---|---|---|---|---|---|---|---|
| Aluminium alloy | AlMg1SiCu | 3.3211 | 170 | 23.0 | 895 | 70,000 | 2,700 | 88 |
| Magnesium alloy | AM50A(EN MCMgAl5Mn) | EN-MC21220 | 65 | 14.0 | 1020 | 45,000 | 1,770 | 58 |
| Pure nickel | Nickel 201 | 2.4068 | 79 | 1.8 | 456 | 205,000 | 8,900 | 95 |
| Structural steel | S355JR | 1.0045 | 54 | 0.0 | 461 | 210,000 | 7,850 | 170 |
| Q&T steel | 25CrMo4 | 1.7218 | 49 | 0.4 | 435 | 210,000 | 7,750 | 216 |
| Structural steel | S235 | 1.0038 | 54 | 0.0 | 461 | 210,000 | 7,850 | 123 |
| Carbon steel | SAE-AISI 1008 | 1008 | 65 | 13.1 | 470 | 190,000 | 7,900 | 97 |
| Heat-resistant steel | P235GH | 1.0345 | 57 | 13.0 | 461 | 210,000 | 7,850 | 143 |
| Heat-resistant pressure tank steel | P265Gh | 1.0425 | 51 | 13.0 | 461 | 210,000 | 7,850 | 155 |
| Stainless ferritic steel | X6CrMoS17 | 1.4105 | 25 | 13.0 | 460 | 220,000 | 7,700 | 200 |

Figure 2:
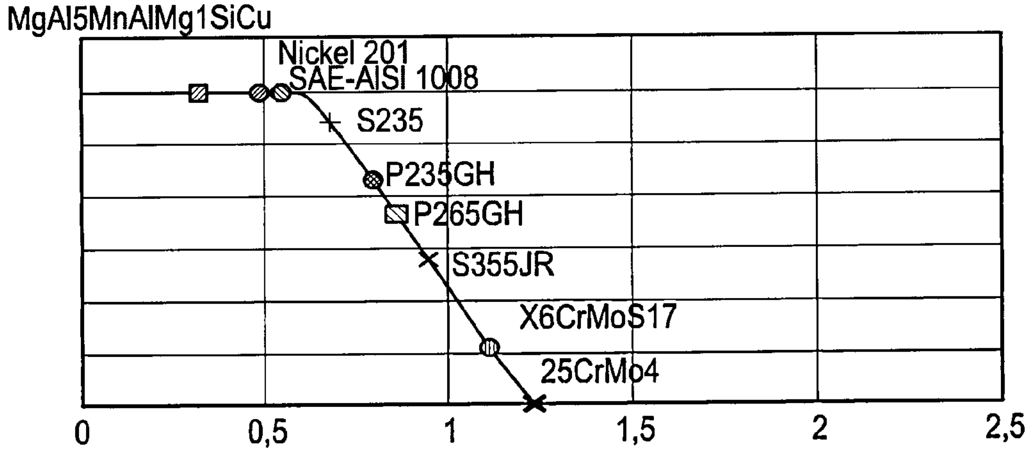

Zinc oxide is a mineral. The hardness of the zinc oxide is accordingly measured on the Mohs hardness scale, which is based on the scratch resistance of the minerals. Its value is approx. 4. Although an exact conversion of the Brinell hardness value into a value typical in mechanical engineering is not possible, a standard value for the Brinell hardness of zinc oxide is considered to be approx. 180 HBW (HBW=Härte Brinell Wolframkarbid (hardness Brinell tungsten carbide)). If one forms the ratio of the hardness of the materials under consideration to the hardness of the zinc oxide and plots the same in the graph shown in FIG. 1, the following picture emerges: The Q&T steel 25CrMo4 is the only material found with a low level of wear. The magnesium alloy, the pure nickel and the carbon steel are found in the range of maximum wear by abrasion. All the other materials are located in the transition range (FIG. 2).

Figure 3:
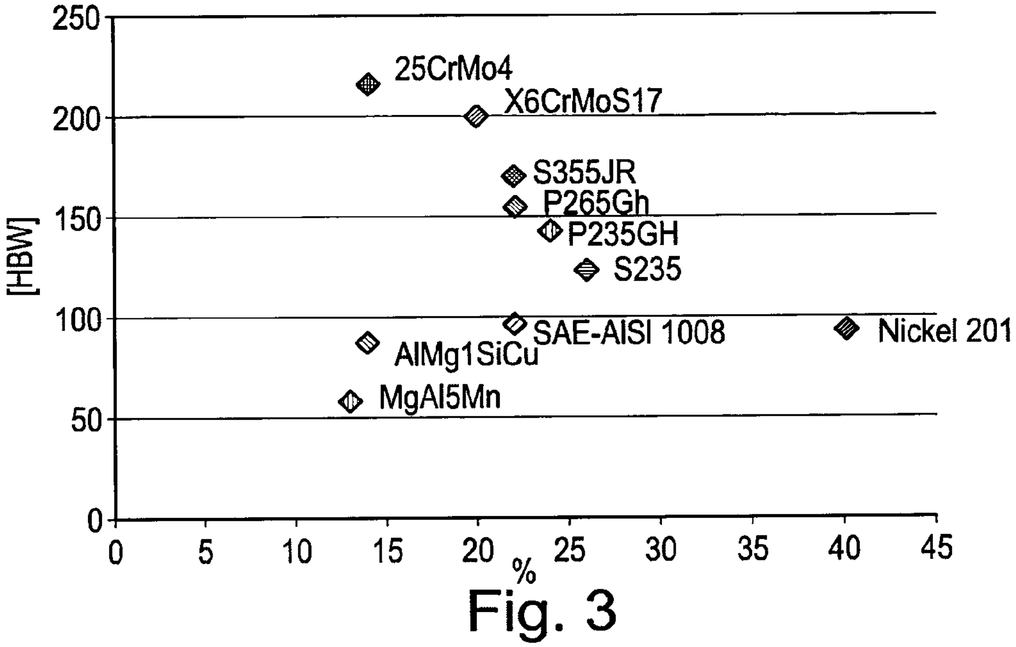

As, in addition to the mechanism of abrasion, surface breakdown is also significant, the materials are also assessed with regard to their wear resistance to such breakdown. Elongation at break can be used as a measurable variable for this resistance. This value reflects the ductility of the materials, which counteracts surface breakdown in proportion to its magnitude. FIG. 3 depicts the material properties of hardness in relation to elongation at break, as wear depends on the combination of these two properties.

Accordingly, materials located in the upper right area of the graph are preferable for use in a rotary cooler due to their combination of hardness and elongation at break. Materials found in the lower right area, such as nickel, possess good wear resistance with respect to surface breakdown, but are vulnerable to abrasion due to their low hardness. The two alloys of aluminium and magnesium do not exhibit a particularly good resistance for either of the two mechanisms. It should be taken into account, however, that the proportion of the abrasion outweighs that of the surface breakdown. This is due to the small particle diameters between 0 mm and 6 mm of the zinc oxide. A weighting factor, which is not taken into account in FIG. 3, should accordingly be applied. The ratio of abrasion to surface breakdown is defined, for example, as ⅔ to ⅓.

Figure 4:
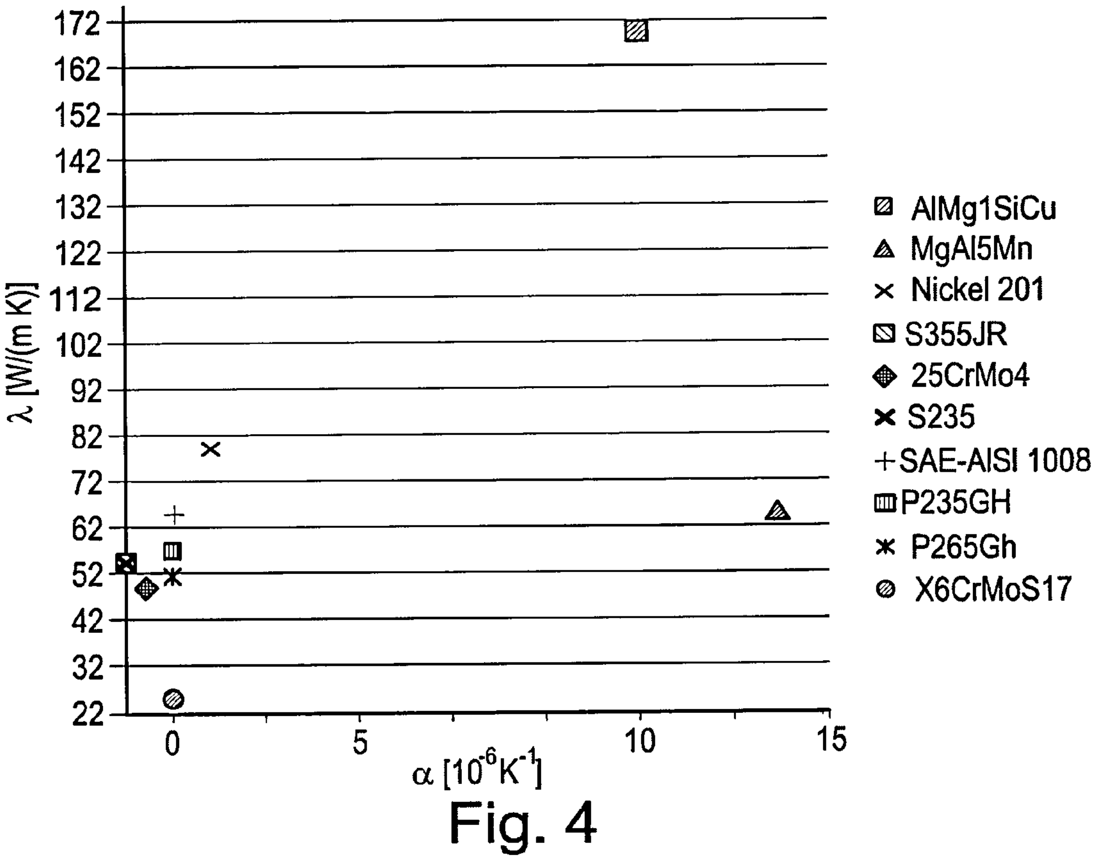

As it is mainly the heat transfer of the sectional cooler that is improved in accordance with the invention, the thermal conductivity of the individual materials is primarily considered. Regardless of geometry, increased heat flows can be achieved through the use of the particularly suitable materials with a higher thermal conductivity. It should be noted, however, that the number of viable materials may be limited as a function of the joining process. Moreover, the thermal expansion coefficient should be considered. When the sections are made of structural steel with a coefficient of approx. $12\times10^{-6}\ K^{-1}$, stresses can occur when the cooling ribs are made of other materials. The sections and cooling ribs are at room temperature during the joining process. When the cooler is started up, its temperature rises, and the components expand. If the materials have different thermal expansion coefficients, they accordingly expand to different degrees. As a result of this difference in expansion, stresses occur in the area of the joint zone. Depending on temperature and the difference between the thermal expansion coefficients, such stresses can be larger or smaller. Depending on the joining process, it is accordingly possible that critical stresses are exceeded. In FIG. 4, the thermal conductivity is thus plotted in relation to the difference between the thermal expansion coefficients of the material of the cooling ribs under consideration and the structural steel IS235JR used in the sections.

The aluminium alloy is shown to possess the highest thermal conductivity, but also a considerable difference from the thermal expansion coefficient of structural steel. Along with the magnesium alloy, which has a much lower thermal conductivity in comparison with the aluminium alloy, the greatest stresses are to be expected in the area of the joint zone. All other materials lie in a similar range with respect to their thermal expansion coefficient and thermal conductivity, the stainless ferritic steel X6CrMoS17 having the lowest thermal conductivity.

Figure 5:
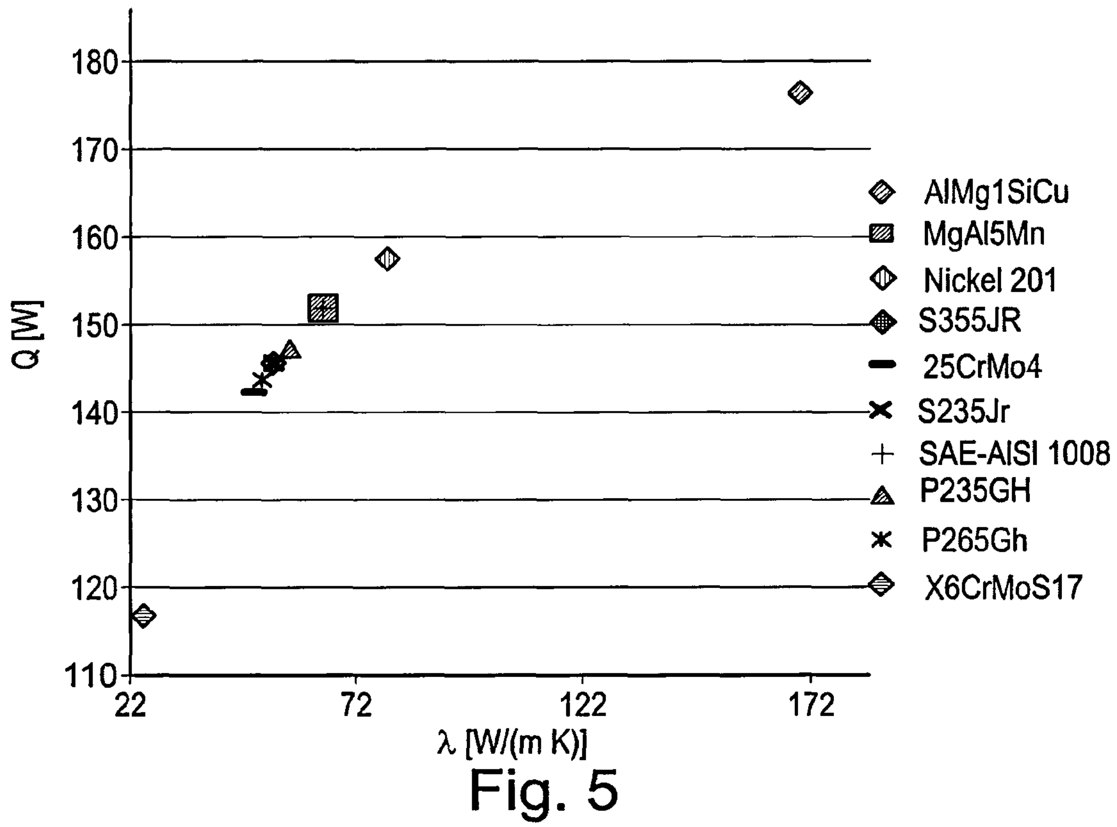

A comparison of the transferred heat flow under identical conditions merely with the different materials yields the heat flow depicted in FIG. 5 as a function of thermal conductivity. A curve resembling that of a square root function is shown. When the thermal conductivity values are low, the heat flow increases steeply. When the thermal conductivity increases, the heat flow continues to increase; the slope of the curve, however, decreases significantly. The heat flow of X6CrMoS17 is consequently approx. 20% lower than that of S235JR, although its thermal conductivity is over 50% lower that of the latter. The thermal conductivity of the aluminium alloy exceeds the value of the structural steel by more than 200%. The gain in heat flow, however, is merely 20%. The curve is thus approaching a maximum heat flow.

FIG. 5 shows the transferred heat flow as a function of thermal conductivity. A further assessment criterion is the thermal diffusivity in relation to the described thermal fatigue. Although a sectional cooler has a low number of operating cycles, it being shut down solely for maintenance and repairs, a thermal fatigue of the cooling ribs can still occur if their thermal diffusivity is too low. Higher thermal diffusivities of the materials as well as of their geometries are preferable in order to avoid fissures in the components and manifestations of fatigue.

Figure 6:
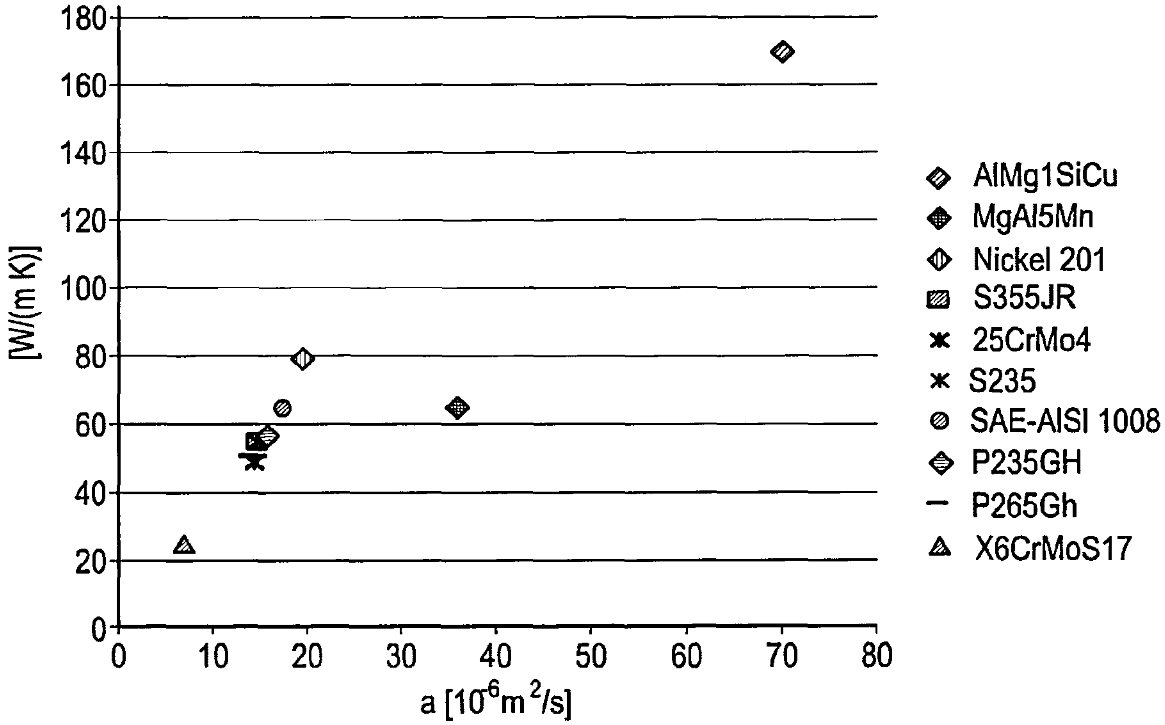

FIG. 6 depicts the thermal conductivity of the materials in relation to their thermal diffusivity graphically. With respect to its thermal properties, the aluminium alloy once again achieves the best result by its high thermal conductivity and diffusivity. As thermal diffusivity is a composite of thermal conductivity, density and specific heat capacity, it becomes clear why the aluminium alloy with its low density and high thermal conductivity has a high thermal diffusivity. The magnesium alloy also possesses a high thermal diffusivity. With respect to thermal diffusivity, the alloy X6CrMoS17 has the worst properties. The remaining materials have approximately the same thermal diffusivities, with the known differences in thermal conductivity.

In order to identify the most suitable material, the factors or assessment criteria discussed above such as hardness, elongation at break, thermal conductivity, expansion coefficient, thermal diffusivity, heat flow and cost are evaluated. The individual assessment criteria are provided, for example, with weighting factors in accordance with their importance (cf. Table 2).

TABLE 2

Weighting factors of the assessment criteria

| Assessment criterion | Weighting factor |
|---|---|
| Hardness | 0.30 |
| Elongation at break | 0.20 |
| Thermal conductivity | 0.20 |
| Difference between thermal expansion coefficients | 0.15 |
| Thermal diffusivity | 0.05 |
| Heat flow | 0.20 |
| Sum: | 1 |

In addition to thermal conductivity, the transferred heat flow is considered in the assessment with the same weighting factor, as it has been shown that, although decisive for the heat flow, thermal conductivity does not exhibit a linear progression. The purpose of the determined heat flow is thus to act as an additional factor in order to compensate for this non-linearity. The criteria related to the wear or fatigue of the materials also have a large influence.

The evaluation is carried out by respectively giving the highest value of an assessment criterion the value one. The value zero respectively constitutes the lower limit. A linear progression is formed between the high and the low value so that the remaining values lie between these two limits. The determined values are subsequently multiplied by the corresponding weighting factor. This is carried out for the different assessment criteria before finally adding up the individual results. The best possible assessment sum would thus be the value one.

Example: The alloy 25CrMo4 possesses the highest hardness with 216 HBW. This accordingly corresponds to the value 1. It follows that the remaining materials receive an assessment score of 0.01 per 2.16 HBW. Accordingly, a value of 0.57 results for the structural steel S235JR with a hardness of 123 HBW. Multiplied by the weighting factor, this yields the values 0.3 and 0.171.

The complete evaluation is depicted in Table 3. The best result is obtained by the Q&T steel 25CrMo4 with a total score of 0.8032. It is followed by the structural steel S355JR with a score of 0.7972. As these two materials obtained similarly good results, the final decision regarding the selection of the material is made based on the joining process used.

The Q&T steel has the significant disadvantage that, in case of welding, it has to be annealed over several hours under minimal stress and at high temperatures between 680° C. and 720° C. in order to reduce stresses inside the heat-affected zone caused by the welding. In view of the large components of a sectional cooler, this means, in addition to the investment in terms of time, significant technical expenditure. The readily weldable structural steel S355JR requires no such time- and cost-intensive follow-up treatment. The Q&T steel 25CrMo4 is consequently preferable in the case of all joining processes except welding, for which the advantages of the structural steel in view of its easier handling prevail.

The manner in which the ribs are attached to the sections of the sectional cooler has a decisive impact on service life and transferred heat flow. In the following, the advantages and disadvantages of the individual joining processes are discussed and respectively compared with the other methods.

A great advantage of adhesive bonds is that a homogenous result can be obtained for all metals with a good pre-treatment. Different material combinations are thus possible. However, other factors are to be considered based on the type of adhesive used.

Structural adhesives can absorb loads up to 30 MPa. This is many times lower than the other joining processes. In order to be rendered capable of bearing these loads, however, very laborious pre-treatments of the workpieces are necessary, as this is the only way of ensuring a good wetting of the surfaces, which is crucial for the quality of the bond. As an even and thin layer thickness of the adhesive is also crucial, both sections and cooling ribs must meet high tolerance requirements. Despite the low thermal conductivity of the adhesive, the heat flow is only altered imperceptibly due to its low layer thickness.

It must further be considered that an even pressure must be applied to the adhesives during the time-intensive drying process. Moreover, the sections must be completely heated during the drying process. This requires a large amount of energy as well as a large technical expenditure. Although there are adhesives with operating temperatures over 1000° C., these are all subject to ageing processes. In addition, there is the risk of creepage at high temperatures, which can reduce the service life of the sectional cooler drastically.

With elastic adhesives, the tolerance requirements of the components are lower as a result of the larger layer thicknesses. The transferred heat flow, however, sinks drastically as a result. Moreover, the loads that can be borne are lower than is the case with structural adhesives. In order to be able to absorb an identical force, a larger contact surface is accordingly required.

Even more advantageous than adhesive connections are threaded connections by means of which different materials can also be connected to each other. As these connections are not of the materially bonded type, but of the force-locked variety, a high degree of geometrical precision must also be observed in order to establish a complete contact between the surfaces of the rib and section so that the heat is transferred via heat conduction. Cavities between the section and the rib lead to natural convection between the two components. This would reduce the transferred heat flow significantly.

In contrast to adhesive connections, threaded connections can bear significantly higher loads by adapting the components used, such as screws and nuts. However, a plurality of holes, through which the screws are guided, have to be drilled into the sections. The strength of the sections is

TABLE 3

| | Hardness [HBW] | Evaluation of hardness | Elongation at break [%] | Evaluation of elongation at break [%] | Thermal conductivity [W(mK)]] | Evaluation of thermal conductivity | Difference to expansion coefficient S235 | Evaluation of expansion coefficient |
|---|---|---|---|---|---|---|---|---|
| AlMg1SiCu | 88 | 0.407 | 14 | 0.350 | 170 | 1.000 | 10.967 | 0.215 |
| MgAl5Mn | 58 | 0.269 | 13 | 0.325 | 65 | 0.382 | 13.967 | 0.000 |
| Nickel201 | 95 | 0.440 | 40 | 1.000 | 79 | 0.465 | 1.800 | 0.871 |
| S355JR | 170 | 0.787 | 22 | 0.550 | 54 | 0.318 | 0.000 | 1.000 |
| 25CrMo4 | 216 | 1.000 | 14 | 0.350 | 49 | 0.288 | 0.400 | 0.971 |
| S235JR | 123 | 0.569 | 26 | 0.650 | 54 | 0.318 | 0.000 | 1.000 |
| SAE-AISI 1008 | 97 | 0.449 | 22 | 0.550 | 65 | 0.382 | 1.033 | 0.926 |
| P235GH | 143 | 0.662 | 24 | 0.600 | 57 | 0.335 | 1.000 | 0.928 |
| P265GH | 155 | 0.718 | 22 | 0.550 | 51 | 0.300 | 1.000 | 0.928 |
| X6CrMoS17 | 200 | 0.926 | 20 | 0.500 | 25 | 0.147 | −0.033 | 1.002 |

| | Thermal diffusivity ×10ˆ−6 | Evaluation of thermal diffusivity | Heat flow [W] | Evaluation heat flow | Associated costs | Evaluation of costs | Sum |
|---|---|---|---|---|---|---|---|
| AlMg1SiCu | 70.350 | 1.000 | 175.98 | 1.000 | 1.00 | 1.000 | 0.746 |
| MgAl5Mn | 36.003 | 0.512 | 151.66 | 0.862 | 1.00 | 1.000 | 0.542 |
| Nickel201 | 19.466 | 0.277 | 157.56 | 0.895 | 10.53 | 0.000 | 0.587 |
| S355JR | 14.922 | 0.212 | 145.59 | 0.827 | 1.18 | 0.981 | 0.797 |
| 25CrMo4 | 14.535 | 0.207 | 142.26 | 0.808 | 2.01 | 0.894 | 0.803 |
| S235JR | 14.922 | 0.212 | 145.59 | 0.827 | 1.18 | 0.981 | 0.747 |
| SAE-AISI 1008 | 17.506 | 0.249 | 151.66 | 0.862 | 1.18 | 0.981 | 0.705 |
| P235GH | 15.751 | 0.224 | 147.11 | 0.836 | 1.18 | 0.981 | 0.765 |
| P265GH | 14.093 | 0.200 | 143.64 | 0.816 | 1.18 | 0.981 | 0.764 |
| X6CrMoS17 | 7.058 | 0.100 | 116.71 | 0.663 | 3.55 | 0.732 | 0.726 |

reduced by said holes. Moreover, this area has to be sealed. This requires the use of further components.

Besides weakening the sections by the holes, the clamping force between the screw head and the nut creates stresses in the sections which compound the stresses occurring during operation.

Figure 7:
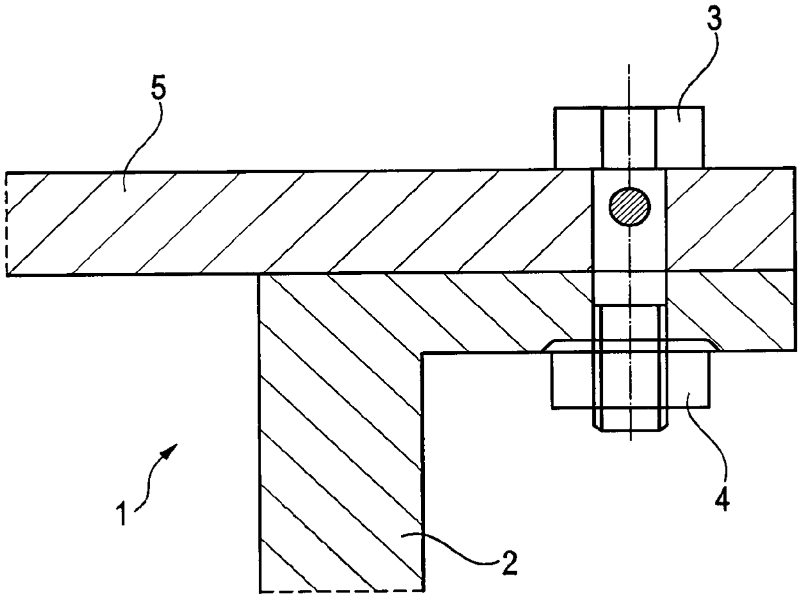

In a section 1 (FIG. 7) of a sectional cooler, a rib 2 has an L shape (L-shaped rib) and is connected to a wall 5 of the section 1 via a screw 3 and a nut 4. This way, the rib 2 forms a contact surface for the screw head of the screw 3. By using screws 3, the ribs 2 can be replaced in a non-destructive manner.

As an alternative to the use of threaded connections, riveted connections can also be used.

The press-in connection method requires the use of ribs which are pushed through the wall of the section at least in areas.

Following the insertion, the wall of the section and the rib in question can be additionally glued or welded.

A further method for producing a connection between the ribs and the wall is joining by welding, which is subdivided into two categories. Both submerged arc welding and metal inert gas welding are used, as well as friction welding and stud welding.

Submerged arc welding is not suitable for all welding positions, as the powder lies loose on the welding zone. Consequently, only welding positions with a small inclination can be realized. Every section of a sectional cooler consists of two joined parts. These are welded together after the installation of the catch strips and conveying blades.

In comparison with submerged arc welding, the welding torches in MIG welding (MIG metal inert gas welding), which can be automated and or performed manually, have significantly smaller dimensions. The preparations necessary for welding the ribs to the sections are less than the preparations required for bonding, screwing or riveting. Inaccuracies can be compensated by introducing additional filler material. With respect to the heat flow, the ribs merely have to be provided with bevels in order to be able to ensure a complete surface contact. Within the weld, the material has an approximately identical thermal conductivity as the base material. By means of welds with a complete surface contact between the rib and the section, very good results can be achieved with respect to the transferred heat flow between the two components.

Despite the impact on the structure caused by the high thermal stress during welding, the loads that can be borne are, in spite of the stresses inherent in the welding process, considerably higher in comparison with bonding with a structural adhesive or those of a press-in connection. Further, no additional contact surface area is necessary than is the case with threaded or riveted connections. As the ribs are entirely bordered by welds, it is merely necessary to reduce the length of the ribs. Accordingly, instead of one long rib, three to four shorter ribs are mounted along the sections; this can also be called an interrupted rib. This reduces warpage and stresses. Follow-up treatments of the welds are not necessary, as the structural steel S355JR is readily weldable, while repairs can also be conducted at the mounting sites in the same manner. Additional components are limited to the welding wire so that assembly is not unnecessarily complexer or more susceptible to errors than is the case with threaded connections.

For rotationally symmetrical cooling ribs, on the other hand, there is either frictional welding or stud welding. Frictional welding is characterized by a very good quality in the area of the welding zone. The strength is superior to that of the base material.

The thermal stress and, consequently, warpage and inherent stresses are lower than is the case with a fusion welding method.

This shows that metal inert gas welding constitutes the preferred option for the joining of cooling ribs.

Stud welding is characterized by very short welding times. These are considerably shorter than those of frictional welding. Due to the shorter welding times, the thermal stress is lower than is the case, for example, with MIG welding. The strength of the materially bonded connection is superior to that of the base material. Further, the connection is not subject to ageing processes, as is the case with adhesive bonds.

The preparation of the welding zone is identical to that of MIG or submerged arc welding (SAW) and is accordingly significantly shorter compared to the other considered methods. If the cooling ribs have a round cross-section, the cutting of the long rod to the desired length is sufficient as preparation in the area of the ribs. The sections do not have to be provided with laboriously drilled holes with minimum tolerances. Additional filling materials are not required; merely a shielding from the atmosphere by means of an inert gas is necessary.

The small dimensions of the welding gun of a stud welding unit enable an easy mounting of the ribs in all areas of the section. Moreover, the required level of manual skill is very low due to the easy handling of the welding gun.

It should be noted, however, that the maximum weldable diameter of the cooling ribs is limited to 30 mm. Bubbling must also be taken into account in order to achieve a complete surface contact and thus the best possible heat transfer.

Despite the limitation of the outer diameter to 30 mm, stud welding offers the best compromise in light of the good mechanical properties of the joint zone in combination with the easy handling of the welding pistol and the very short welding times. Stud welding should consequently be implemented for round geometries of the cooling ribs.

The cooling ribs are thus welded to the sections regardless of their geometry. The structural steel S355JR is thus to be preferred to the Q&T steel 25CrMo4, as it is readily weldable and does not require any follow-up treatment. As the structural steel S355JR is a low-alloy structural steel, it is recommended to use an active gas as the protective gas, as it is less expensive than an inert gas.

According to the invention, a geometry of the cooling ribs is also provided that meets a plurality of criteria, in particular with respect to the heat flow.

The purpose of the heat flow in relation to the contact surface between the cooling rib and the section is to determine the heat flow per 1 $mm^2$. This way, the efficiency of the different geometries can be estimated regardless of the size of the rib or its contact surface with the section. As some ribs such as, for example, blade-shaped ribs, occupy a significantly larger area of the section than their contact surface, this is taken into account by a projected surface area, i.e. the surface area covered by the contour of the rib.

This must be taken into account with respect to the quantity of ribs to be installed, as the possible quantity depends to a large extent on the projected surface area. Heat flow in relation to the projected surface area is consequently also examined. In addition to the surface areas, the weight of the ribs is also considered in the evaluation. The heat flow in relation to the weight of the cooling rib acts as a further criterion of the efficiency of the geometry under consideration. By means of a high quotient of heat flow and weight, a better use of resources is achieved while material consumption and the associated material costs are reduced.

As a further criterion, the ratio of the heat flow at a time t, for example t=28 s, is compared with a steady-state heat flow towards the end of the simulation. By means of this ratio, the thermal diffusivity of the geometry can be determined. A high thermal diffusivity of the geometry also prevents or reduces the risk of thermal fatigue.

The weighting of the different criteria is shown in Table 4. The two heat flows in relation to the surface areas are the decisive criteria for the geometries. Their weighting factors together are thus 0.65. The relation of the heat flow to the weight of the rib provides an indication of the efficiency of the rib, yet no decisive information as to the general improvement of the heat flow in relation to the cooling rib currently being used. Although not to be neglected, this criterion is thus factored by a weighting factor of 0.2 lower than the heat flows in relation to the surface areas. With a weighting factor of 0.15, thermal diffusivity is inferior to the other factors. This is justified, as it is above all the ratio of the heat flows at different times that is decisive for the thermal fatigue.

TABLE 4

Weighting factors of the assessment criteria for geometry

| Assessment criterion | Weighting factor |
|---|---|
| Heat flow per surface area | 0.4 |
| Heat flow per projected surface area | 0.25 |
| Heat flow per kilogram | 0.2 |
| Thermal diffusivity | 0.15 |
| Sum | 1 |

The evaluation of the different geometries occurs in a similar manner to the preliminary selection of the material. The highest value of an assessment criterion is respectively provided with the value 1. Subsequently, a linear gradation down to the value 0 is created and the remaining geometries are provided with a corresponding value. The values are multiplied by the weighting factors and subsequently added together. The maximum obtainable sum is thus the value 1.

Figure 8:
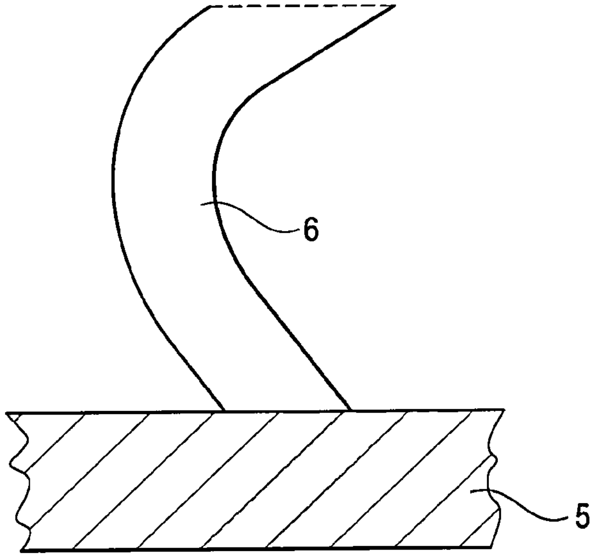

The evaluation is depicted in Table 5. The best result in the sum with 0.859 points belongs to a wave-shaped rib 6 (FIG. 8) (merely indicated by "wave-shaped" in Table 5). This is due to the large surface area obtained by its geometry. It must be taken into account, however, that elongated ribs should be attached to the sections by means of MIG welding. Although it is possible to realize the required bevel due to its contour so as to ensure a complete surface contact between rib and section, it is, however, not possible to use the welding torch on the left side of the rib (FIG. 8) because of its curvature. As the result of a geometrical alteration of its geometry in order to ensure weldability, the score is reduced by nearly 0.2 points to 0.672. Although only a "half-wave" of a cross-section of such a rib 6 is depicted in FIG. 8 in cross-section, it is understood that each rib 6 can have a plurality of wave crests and wave troughs in accordance with the invention.

Table 5 shows the evaluation of the geometry.

Following the unaltered wave-shaped rib by a difference of 0.084 points is the optimized rectangular rib. This rib already possesses its best possible result due to its optimally calculated height, while the other geometries have the potential to achieve better results through further alterations. A further reason for the good result of the optimized rectangular rib is the high efficiency of its geometry, which is explained by the low factor m×h.

The next best result belongs to the round geometry with a depression with a ratio of the inner radius $R_i$ of a circular hollow rib 7 to an outer radius $R_a$ (cf. FIG. 9) of 2 to 3. With a score of 0.765, it lies behind the value of the optimized rectangular rib by a score of 0.009. Each of the ribs 7 is provided with a bore in the middle. In addition to considerable additional work, this is also associated with increased tool costs.

TABLE 5

| | | Heat flow per surface area | Recalculation with weighting factor | Heat flow per proj. surface area | Recalculation with weighting factor | Heat flow per kg | Recalculation with weighting factor | Thermal diffusivity | Recalculation with weighting factor | SUM |
|---|---|---|---|---|---|---|---|---|---|---|
| Convex Inverse | round | 1.000 | 0.400 | 0.343 | 0.086 | 0.330 | 0.066 | 0.879 | 0.132 | 0.684 |
| Wave-shaped | | 0.804 | 0.322 | 0.769 | 0.192 | 0.973 | 0.195 | 1.000 | 0.150 | 0.859 |
| Tree | | 0.796 | 0.319 | 0.327 | 0.082 | 0.736 | 0.147 | 0.958 | 0.144 | 0.691 |
| Trapezoid inverse | | 0.767 | 0.307 | 0.404 | 0.101 | 0.512 | 0.102 | 0.827 | 0.124 | 0.634 |
| Tree inverse | | 0.761 | 0.305 | 0.313 | 0.078 | 0.704 | 0.141 | 0.959 | 0.144 | 0.667 |
| Blade raised 0.75 | | 0.727 | 0.291 | 0.319 | 0.080 | 0.542 | 0.108 | 0.925 | 0.139 | 0.618 |
| Convex inverse | | 0.699 | 0.279 | 0.383 | 0.096 | 0.361 | 0.072 | 0.711 | 0.107 | 0.554 |
| Fork | | 0.664 | 0.266 | 0.520 | 0.130 | 0.843 | 0.169 | 0.942 | 0.141 | 0.705 |
| Bladeraised 1 | | 0.643 | 0.257 | 0.211 | 0.053 | 0.412 | 0.082 | 0.931 | 0.140 | 0.532 |
| Blade raised 0.5 | | 0.630 | 0.252 | 0.414 | 0.103 | 0.560 | 0.112 | 0.912 | 0.137 | 0.604 |
| Rectangle | | 0.608 | 0.243 | 1.000 | 0.250 | 0.754 | 0.151 | 0.867 | 0.130 | 0.774 |
| Rectangle serrated | | 0.588 | 0.235 | 0.966 | 0.242 | 0.752 | 0.150 | 0.876 | 0.131 | 0.758 |
| Roundhollow 1 to 3 | round | 0.551 | 0.220 | 0.906 | 0.226 | 0.698 | 0.140 | 0.872 | 0.131 | 0.717 |
| Roundhollow 1.5 to 3 | round | 0.549 | 0.220 | 0.903 | 0.226 | 0.792 | 0.158 | 0.926 | 0.139 | 0.743 |
| Angular | round | 0.542 | 0.217 | 0.892 | 0.223 | 0.579 | 0.116 | 0.774 | 0116 | 0.672 |
| Roundhollow 2 to 3 | round | 0.527 | 0.211 | 0.867 | 0.217 | 0.944 | 0.189 | 0.990 | 0.149 | 0.765 |
| Parabola | | 0.524 | 0.210 | 0.861 | 0.215 | 0.776 | 0.115 | 0.827 | 0.124 | 0.704 |
| Rectanglestandard | | 0.523 | 0.209 | 0.859 | 0.215 | 1.000 | 0.200 | 0.797 | 0.120 | 0.743 |
| Trapezoid | | 0.508 | 0.203 | 0.835 | 0.209 | 0.944 | 0.189 | 0.862 | 0.129 | 0.730 |

TABLE 5-continued

| | | Heat flow per surface area | Recalculation with weighting factor | Heat flow per proj. surface area | Recalculation with weighting factor | Heat flow per kg | Recalculation with weighting factor | Thermal diffusivity | Recalculation with weighting factor | SUM |
|---|---|---|---|---|---|---|---|---|---|---|
| Round | round | 0.463 | 0.185 | 0.761 | 0.190 | 0.534 | 0.107 | 0.729 | 0.109 | 0.592 |
| Trianglepointed | | 0.441 | 0.177 | 0.725 | 0.181 | 0.923 | 0.185 | 0.794 | 0.119 | 0.662 |
| Convex | | 0.430 | 0.172 | 0.707 | 0.177 | 0.606 | 0.121 | 0.721 | 0.108 | 0.578 |
| Claw | | 0.409 | 0.164 | 0.270 | 0.067 | 0.539 | 0.108 | 0.709 | 0.106 | 0.445 |
| Convex | round | 0.396 | 0.158 | 0.651 | 0.163 | 0.679 | 0.136 | 0.671 | 0.101 | 0.557 |

The simulation of a tube with significantly lower production costs and with the identical diameters of the bored rib, however, shows the potential of this geometry. This geometry obtains a score of 0.787 with a heat flow of $\dot{Q}$=62.2 W. This score exceeds the score of the optimized rectangular rib without having exhausted the complete potential of the geometry. With respect to the attachment of the tube ribs to the sections, a relatively recently developed variation of stud welding can be used, Magnetic Rotating Arc (MARC) welding.

The latter possesses properties that are almost identical to those of stud welding and differs primarily in the form of the arc. A magnetically moved circular arc is generated between the rib and the section. The arc causes an annular weld pool of the two components to form. The advantage of extremely short welding times is also retained with this method. The quality of the weld is very good with strengths that are superior to those of the base materials. Moreover, MARC welding is not as prone to bubbling.

As it provides close to the best results with respect to heat flow, the geometry of a tube in combination with MARC welding will be discussed in detail in the following with the aid of an example embodiment.

The tube-shaped geometry of the cooling rib is discussed in the following using the example of a standardized tube. The measurements are indicated, for example, in DIN EN 10220. The diameter at which the MARC welding method is possible is, as with stud welding, for example approx. d=30 mm. The smallest, for example, selected diameter is d=25 mm. The thickness of the wall is varied between T=6.3 mm and T=5 mm.

The evaluation is carried out in an identical manner to the evaluation described above. The same assessment criteria are used with the same weighting factors. However, a further assessment criterion, the heat flow, is added. As the rib is invariably a tube rib here, this addition is possible without further adjustments. The heat flow is weighted with the factor 0.3. The maximum obtainable sum consequently increases to the score 1.3. The length of the ribs is fixed at L=50 mm regardless of the diameters and wall thicknesses.

TABLE 6

| Diameter [mm] | Wall thickness [mm] | Heat flow per surface area | Heat flow per proj. surface area | Heat flow per kg | Thermal diffusivity | Heat flow | SUM |
|---|---|---|---|---|---|---|---|
| 30.0 | 6.3 | 0.129 | 0.086 | 329.249 | 0.816 | 60.620 | 1.109 |
| 30.0 | 5.0 | 0.145 | 0.081 | 369.210 | 0.864 | 56.910 | 1.146 |
| 26.9 | 6.3 | 0.129 | 0.093 | 329.317 | 0.816 | 52.700 | 1.089 |
| 26.9 | 5.0 | 0.147 | 0.089 | 373.267 | 0.864 | 50.400 | 1.142 |
| 25.4 | 6.3 | 0.129 | 0.096 | 329.096 | 0.816 | 48.830 | 1.080 |
| 25.4 | 5.0 | 0.146 | 0.093 | 372.885 | 0.864 | 46.900 | 1.135 |

TABLE 6-continued

| Diameter [mm] | Wall thickness [mm] | Heat flow per surface area | Heat flow per proj. surface area | Heat flow per kg | Thermal diffusivity | Heat flow | SUM |
|---|---|---|---|---|---|---|---|
| 25.0 | 6.3 | 0.129 | 0.097 | 328.978 | 0.816 | 47.790 | 1.078 |
| 25.0 | 5.0 | 0.146 | 0.094 | 373.037 | 0.865 | 46.000 | 1.134 |

Table 6 shows the evaluation of the optimization of diameter and wall thickness.

The evaluation listed in Table 6 shows that the geometries with a wall thickness of T=5 mm principally obtain better results. This is due to the larger surface area for the heat exchange. Despite their smaller wall thicknesses, the tube ribs achieve similar strengths as a comparable rectangular rib with a thickness of T=10 mm due to their round geometry.

The best result is obtained with a diameter of d=30 mm and a wall thickness of T=5 mm. Based on these fixed properties of their geometry, the particularly preferred length of the rib is determined. The length of the rib is varied by a distance of 2 mm in a range between L=30 mm and L=60 mm. As the surface area and the projected surface area are identical, the assessment criteria are limited to heat flow (weighting factor 0.65), heat flow in relation to weight (weighting factor 0.2) and thermal diffusivity (weighting factor 0.15).

Figure 14:
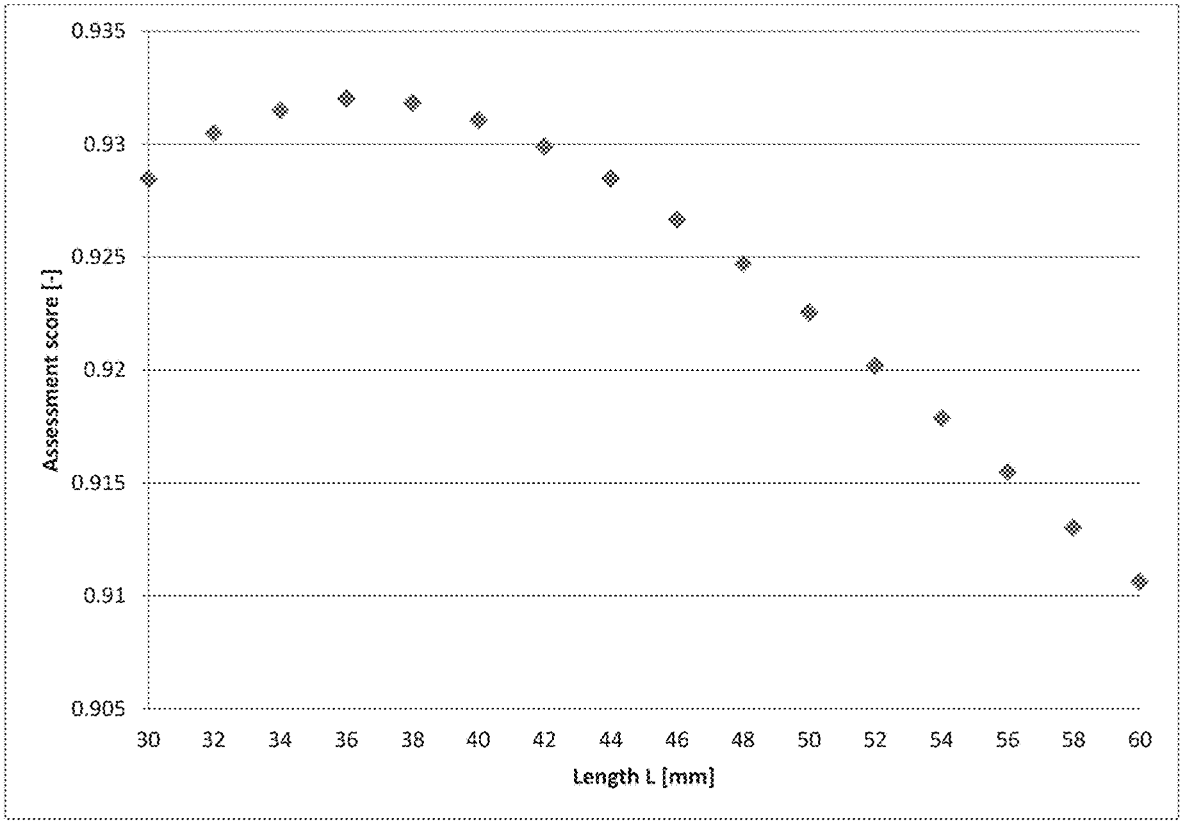
FIG. 14 is a graph showing an evaluation of the optimization of the length of a tube rib as described below.

The results of the evaluation relating to the length of the rib are indicated in FIG. 14. FIG. 14 shows that a length of L=36 mm yields a maximum result. With increasing length, the heat flow increases as of the maximum to a significantly lesser degree in relation to the increasing mass. The curve of the graph falls from the maximum as a result.

The rib with the length of L=36 mm is consequently chosen. This offers the best compromise of the considered criteria.

As the rib is shortened by approximately a length of L=1.5 mm by the welding process, this value must be added to the optimal length of the rib. This yields a length of L=37.5 mm.

The dimensions of the optimization thus yield an outer diameter of the tube of d=30 mm with a wall thickness of T=5 mm and a length of L=36 mm or L=37.5 mm considering the joining process used and the associated decrease in the length.

Besides the already determined and optimized geometry of the ribs, their arrangement in combination with their quantity is also decisive for the transferred heat flow.

In order to determine the distribution of the material to be cooled, for example of zinc oxide, inside the sections and to thus be able to define the distribution of the ribs in the same, the filling ratio $\varphi$ is determined. This is composed of the time of stay, the volume flow of the zinc oxide and the volume of the sections. Based on the filling ratio, the surface area coverage ratio can be determined. The surface area coverage ratio indicates the surface area of the sections covered with the product. This yields $\varphi$=4.17% for the filling ratio and $\lambda_A$=17.61% for the surface area coverage ratio. This corresponds to a surface area coverage of A=0.060 $m^2$ with a cross-sectional surface area of the chamber (section) of $Q_K$=0.342 $m^2$. In combination with the dynamic angle of repose of the zinc oxide of $\theta_{dyn}$=40°, the distribution of the zinc oxide in the sections in their different positions can be determined.

Figure 10:
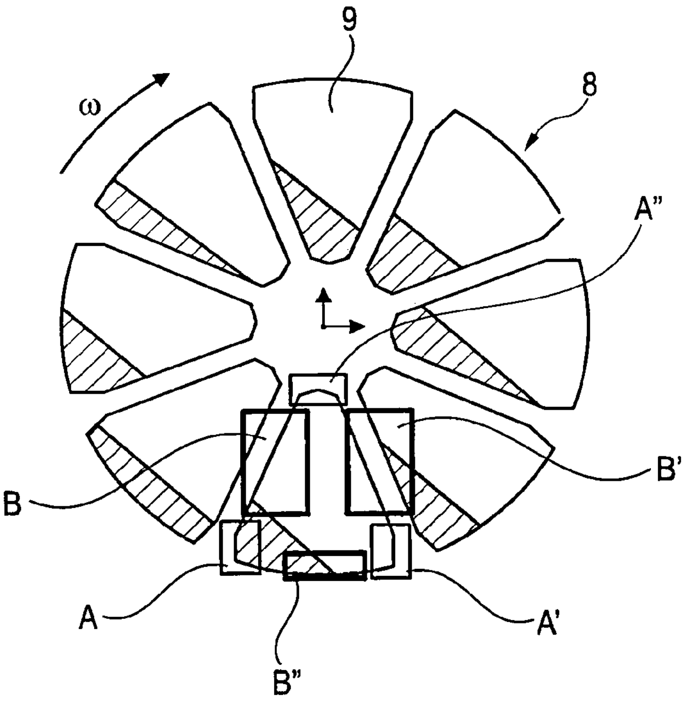

The graphic determination of the surface area coverage of a sectional cooler 8, which is preferably mounted at an incline or which is alternatively mounted horizontally, is depicted in FIG. 10 in cross-section. It shows that each area of the section is covered over a similar time period. There is thus no area in which an installation of cooling ribs would not generate a positive effect. If one considers the distribution of the zinc oxide more closely, it becomes apparent that the product has different speeds in different areas. The areas designated in FIG. 10 by A, A' and A" are the zones in which the zinc oxide flows at lower speeds, whereas it moves at a higher speed in the areas B, B' and B".

More turbulent flows occur at higher speeds, which in turn result in an improved convective heat transfer. The main significance of the catch strips lies in the reduction of the speed of the product in order to reduce the wear of the sections. In accordance with the invention, an increased quantity of cooling ribs is thus preferably mounted in the areas B, B' and B" of the sections in order to exploit the advantage of the flow with respect to the heat transfer while reducing the speeds of the product to an extent that wear is kept to a minimum. Cooling ribs are nevertheless also installed in the areas A, A' and A" in accordance with the invention, as the heat transfer is also significantly improved by the ribs at lower speeds of the product.

By means of the calculated temperature progression, the positions within the cooler can be determined in relation to the heat transfer coefficients.

Simulations, the boundary conditions of which are identical with the exception of the heat transfer coefficients, are carried out once with a cooling rib and once without. By forming the quotients of the heat flow with a cooling rib in relation to the heat flow without a cooling rib, the efficiency in the different areas of the cooler can be determined. The results of the simulation are shown in Table 8.

TABLE 8

Ratio of heat flows at different heat transfer coefficients with and without a cooling rib

| Temperature T [° C.] | Heat transfer coefficient α [W/(mK)] | Heat flow with cooling rib Q̇ [W] | Heat flow without cooling rib Q̇ [W] |
|---|---|---|---|
| 817 | 225.67 | 1268.3 | 245.8 |
| 600 | 200.46 | 872.1 | 160.1 |
| 280 | 156.95 | 337.9 | 55.9 |

The resulting ratios between the heat flows with and without cooling ribs are:

$$X_1 = \frac{\dot{Q}_{Rib1}}{\dot{Q}_1} = \frac{1268.3}{245.8} = 5.2$$

-continued $$X_2 = \frac{\dot{Q}_{Rib2}}{\dot{Q}_2} = \frac{872.1}{160.1} = 5.4$$

$$X_3 = \frac{\dot{Q}_{Rib3}}{\dot{Q}_3} = \frac{337.9}{55.9} = 6.0$$

As the ratios show, a gain in transferred heat flow can be observed in all areas of the cooler. As the temperature drops, and with it the heat transfer coefficient, the ratio of the heat flow between a ribbed and an unribbed surface increases by a further 15%. As the ratios are still all in a similar range, the distribution of the ribs over the length of the cooler should be realized evenly. By means of an even distribution of the cooling ribs, the installation of the same can be simple. This advantage outweighs the slight advantage of an increased ratio of the heat flow in the low-temperature area.

According to the invention, the preferred quantity of cooling ribs to be installed is also determined. To this end, both the heat flows of the contact area with the cooling rib and the heat flows of the base plate surrounding the rib are considered. The geometry of rectangular, for example with the measurements 9.9 m×0.01 m×0.03 m and the geometry of the tube ribs used are considered. In order to observe the minimum distance between two tube ribs of a=18 mm, the maximum quantity of ribs per section is limited to 917 per metre of cooler. A heat flow is achieved with this quantity of ribs that is twice as high as the heat flow according to the prior art.

The heat flow with 971 tube ribs and a cooler length of L=1 m is Q̇=126.182 W per section. With 16 catch strips that are not continuously welded, a heat flow of Q̇=63.146 W is achieved under identical conditions.

An equation can be formulated that determines the heat flow based on the quantity of tube ribs:

$$\dot{Q}=46.287\ \text{W}+x_{Ribs}\times 82.23\ \text{W}$$

The heat flow of the rectangular ribs is already achieved as of a quantity of 205 tube ribs.

TABLE 9

Data of the cooler with 500 tube ribs in comparison with a conventional cooler equipped with rectangular ribs

| | |
|---|---|
| Number of ribs | 500 |
| Increase in heat flow | 38.41% |
| Ratio of length $L_{new}$ to L | 0.722 |
| Net length of cooling chamber new [m] | 7.080 |
| Weight change without installed elements due to new net length of the cooler [kg] | −8,484 |
| Total weight of ribs [kg] | 3,274 |
| Weight difference vis-à-vis mounted catch strips [kg] | 24.5 |
| Weight difference total [kg] | −8,460 |

At a quantity of 500, the ribs attain almost an identical weight as 16 mounted rectangular catch strips per metre. As a result of the increase of the heat flow by approx. 38%, the length of the sectional cooler can be reduced significantly. Based on a net length of the cooling chamber of L=9.8 m, 2.7 m can already be saved so that a new net length of the cooling chamber of L=7.1 m results. Taking the weight of the cooling ribs into account, approx. 8.5 tonnes of material can be saved.

Figure 9:
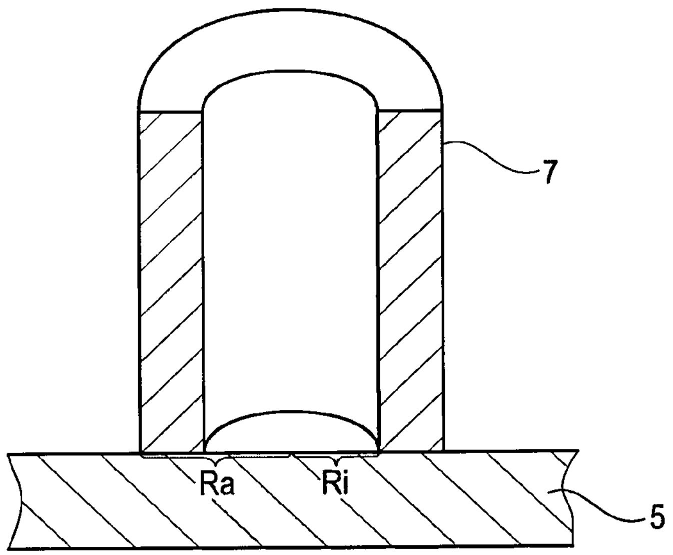

According to one embodiment, this results in a geometry of the ribs in a section 9 of a sectional cooler 8 according to the invention as depicted in FIG. 9.

Figure 11:
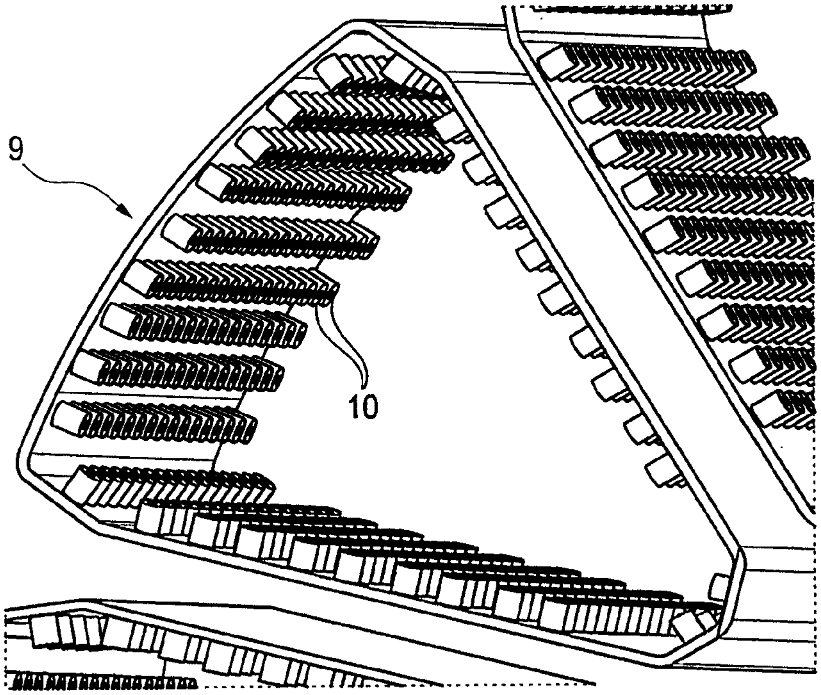

Taking into account the acquired insights relating to the geometry of ribs 10, the different zones A, A', A"; B, B', B" and the quantity of the ribs 10, the following draft design results. As apparent in FIG. 11, significantly more ribs 10 are located in the elongated zones B, B', B" of the sections 9 than in the three corners A, A', A". This is due to the different speeds of the granular bulk material. In the elongated zones B, B', B", the speed is higher, which is why an increased heat transfer takes place in these areas, which can be further improved by an increased quantity of cooling ribs 10. Moreover, the speed of the particles in the proximity of the wall of the section must be reduced to an extent that the wear of the section 9 is kept to a minimum. The depicted section 9 contains approx. 500 ribs 10 over a length of a metre.

Figure 12:
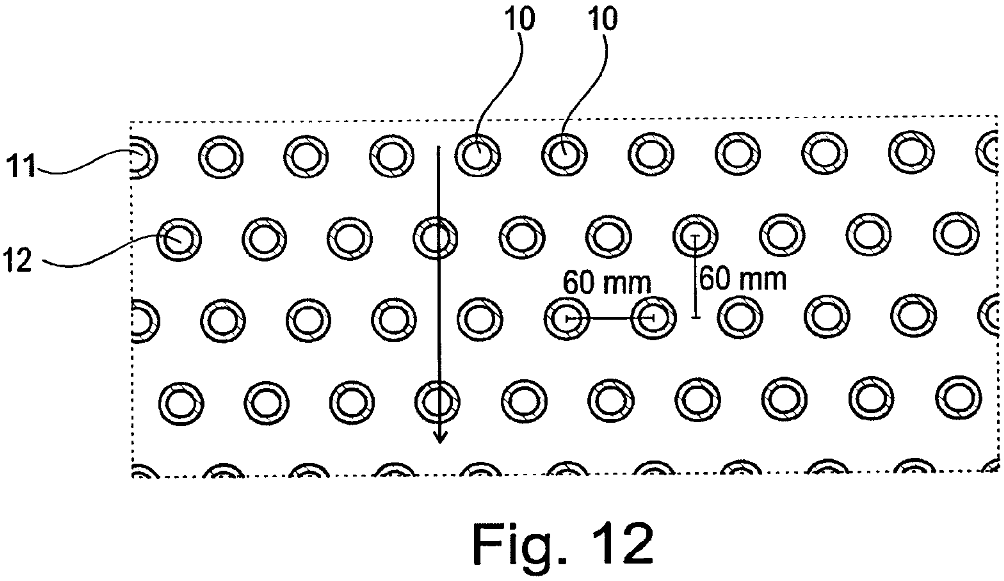
Figure 13:
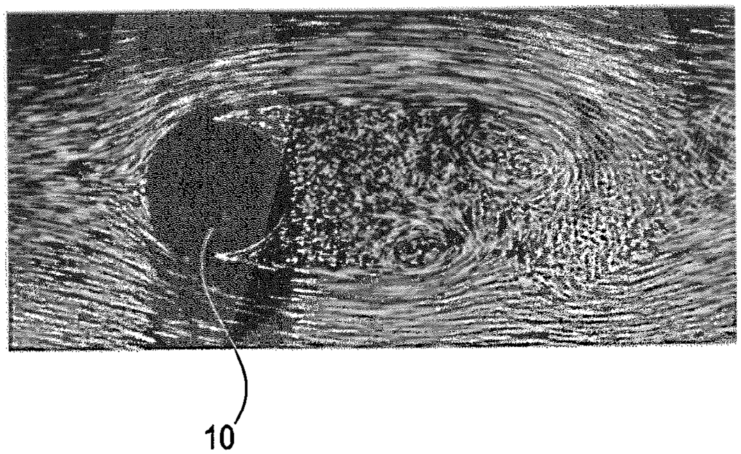

FIG. 12 depicts a top view of the tube ribs 10 in one of the zones with a higher particle speed. By offsetting the ribs 10 between the rib rows 11, 12, these are constantly struck by the flow of the fine-granular zinc oxide. As a result, the speed of the zinc oxide is reduced, while a turbulent flow is achieved by the deflection of the grains, which improves the convective heat transfer. The arrow depicted in FIG. 12 designates the direction of flow. An example of what the flow around one of the ribs could look like is depicted in FIG. 13. The particles are deflected outwards directly in front of the rib. A plurality of eddies typical of turbulent flows are created behind the rib. It is also shown that particles with a lower speed can be found directly behind the rib. With this distribution of the ribs 10, there is no slipstream behind the ribs 10. The zinc oxide is completely in contact with the rib 10 around its perimeter. According to the invention, conveying blades are also provided within the sections. In order to obtain a time of stay of the particles of, for example, t=5.32 minutes in the respective section of the cooler, the conveying blades must also be adapted. This can be achieved by a reduction of the blades, one less bladed wall and an alteration of the axial offset of the blades.

TABLE 10

Adjustment and comparison of the time of stay of the particles according to the invention (New) in comparison with the prior art (Old)

| Name | | Old | New | |
|---|---|---|---|---|
| Length cooling chamber | $L_K$ | 9.9 | 7.18 | m |
| Number of bladed walls | $n_{Ws}$ | 3 | 2 | — |
| Ratio of conveying performance | $\eta$ | 0.3 | 0.3 | — |
| Number of blades per wall | $n_S$ | 15 | 11 | — |
| Offset blades axial | $s_S$ | 0.22 | 0.18 | m |
| Rotational speed | n | 4.7 | 4.7 | $min^{-1}$ |

These adjustments yield a speed of advancement s=0.47 m and thus a time of stay of t=5.49 min. This differs only insignificantly from the previous time of stay. The mounted ribs 10 can function as attachment points for the welding of the conveying blades. As one wall of the cooler no longer has to be provided with blades, the mounting expenditure in this area is reduced.

The selected and optimized geometry in combination with the selected material, the structural steel S355JR, and the joining by means of the special variation of stud welding improve the heat transfer in a sectional cooler significantly compared with designs known from the prior art.

The selected joining process, MARC welding, is characterized by very short welding times so that the welding of the plurality of ribs can be completed in a time that is as short as possible. These short welding times are associated with lower thermal stresses than is the case with other fusion welding methods. This is also reflected in the low warpage of the sections and low welding-inherent stresses in the area of the heat-impacted zone. Also advantageous is the easy handling of the welding gun so that personnel with less training can also perform the welding; welding can, however, also be carried out in a fully automated manner by a welding robot. The small dimensions of the welding gun also allow an accessibility to the sections.

The diameter of the ribs 10 is, for example, d=30 mm. Considering the results in Table 6, however, it is clear that better results are obtained as diameter increases.

The mechanical properties of the material are superior to those of the base material in the area of the joint zone. In combination with the selected material for the ribs 10, a high resistance to the predominant proportionate abrasion thus results in the area in which the product hits the ribs 10. The hardness of the structural steel S355JR is superior to that of the section by almost 40%. Due to the low weight of the selected geometry, the additional costs resulting from the higher-grade structural steel are negligible. With respect to their thermal conductivities, the walls of the section 8 and the ribs have at least essentially the same values. Due to their similar thermal expansion coefficients, stresses resulting from components expanding to varying degrees do not occur in the event of temperature changes. The problem of thermal fatigue is also no longer relevant as a result of the same thermal diffusivity of the two materials, as there have been no signs of fatigue in conventional coolers with catch strips made of S235JR.

As both materials are structural steel or low-alloy steels, they can be readily welded. Moreover, no follow-up treatments of the joint zone are necessary. The ribs 10 can be produced easily by cutting tubes. It is also advantageous when the selected steel is a very common steel.

The geometry of the rib is already impressive as a result of its very good result without any optimization. Its values are superior to those of the optimized rectangular rib. Through optimization, still better results are obtained. The geometry is characterized by a large heat-transfer surface area and a low weight. The optimal length of the rib 10 for the cooler in question is l=36 mm. This value is lower than the value of the optimal rectangular rib by approx. 10 mm. Material and weight can thus also be saved by means of these properties.

Regardless of the quantity of the ribs 10 to be used, they are preferably arranged in an offset manner. It is achieved by this means that the original task of the catch strips, the reduction of the wear of the sections, is fulfilled in spite of the new geometry. By means of the round geometry, coupled with the offset arrangement of the ribs, a more turbulent flow is created, whereby the heat transfer is improved. Moreover, a slipstream is not created behind the ribs. The outer side of the rib is thus constantly in contact with the product to be cooled, which also ensures a high heat transfer.

The number of cooling ribs to be mounted, however, has yet to be determined. The considered value of 500 cooling ribs 10 per section 8 per meter of length only represents an example.

A reduction of the weight of the cooler is linked to further advantages. For starters, the torque required to set the cooler into rotation is lower. Depending on the extent of the reduction of the necessary power output of the motor, its load decreases or it is possible to use a cheaper motor with less power. This reduces the amount of energy required by the system. In addition, the mechanical loads in the area of the pinion and the sprocket for transmitting the motor drive to the outer wall of the rotary cooler are reduced. Furthermore, the loads acting on the bearings are decreased. The loading or dimensioning of the foundations can also be reduced or designed to be smaller depending on the number of ribs. Sectional coolers are operated at sites all over the world. The production of the coolers, however, always takes place at the same site. By means of a lower weight and smaller dimensions, the handling of the sectional coolers during the transport and installation of the coolers is associated with less effort. The costs in terms of space occupied by the sectional cooler, which come up when calculating the cost of a plant, are also lower.

The acquired insights regarding the selected combination of joining process, material and geometry of the cooling ribs offer a clear advantage over the prior art due to the above-mentioned consequences.

A further decisive factor for an improved heat transfer is the fact that the ribs 10 must be attached to the section 9 over their entire supporting surface. This ensures that the energy transferred from the product to the ribs is transported to the water-cooled surface in a manner that is as efficient as possible. A cooler possesses, for example, a length of l=10.5 m. With an outer diameter of d=2.3 m and a weight of m=35,000 kg, a granular substrate is cooled in 8 sections from temperatures over T=700° C. to T=150° C. Based on the known values of the cooler, the temperature progression and the heat transfer coefficients can be determined at different locations of the cooler.

Each of the eight sections of this cooler is respectively provided, for example, with 16 catch strips. Their task is to reduce the speed of the particles and to keep the wear of the sections to a minimum. As it has been found that more heat energy is also transferred by the catch strips, they consequently also act as cooling ribs. The catch strips are studied with a view to the optimization of this property.

In order to ensure both the complete surface contact between rib and section as well as to achieve a high heat flow while taking the prevailing conditions in the sectional cooler into account, it is necessary to determine, in addition to the joining process, the most suitable material.

The determination of the material occurs by considering seven different relevant properties. The wear mechanisms affecting the ribs are, for one, abrasion, which can be reduced by a high hardness of the material, and surface breakdown, which is decreased by means of its ductility. In addition to cost and thermal diffusivity, the difference between the thermal expansion coefficients is also considered in the evaluation. In order to achieve the goal of improving the heat transfer, thermal conductivity and heat flow are also included in the evaluation.

The evaluation of the ten materials yields the result that, while taking into account the subsequently selected joining process, the structural steel S355JR is most suitable for use as the material of the cooling ribs. By means of its higher hardness in comparison with the alloy S235JR, wear by abrasion is reduced. As the result of identical values of thermal conductivity and heat flow of the structural steel S355JR with the structural steel S235JR, there are no losses in the area of heat transfer. As both materials also have the same thermal expansion coefficient, no stresses occur in the contact area between rib and section as the result of changes in temperature between a state of operation and times when the cooler is not in operation.

In order to attach the ribs to the sections with a complete surface contact, two joining processes are particularly suitable, which are to be used based on the geometry of the rib. MAG welding is used with elongated cooling ribs. The cooling ribs are to be provided with two bevels and attached to the sections over their entire surface in a materially bonded manner by means of a double HV seam. For round geometries, stud welding is suitable due to its very short welding times and very good mechanical properties of the joint zone. Moreover, no additional materials are required. Preparation is limited to the cutting of the ribs to the required length and the required skill for handling a stud welding device is low.

The further decisive factor of the cooling rib, its geometry, is also obtained through the assessment of different criteria. The heat flow in relation to the contact surface area, the heat flow in relation to the projected surface area, the heat flow in relation to the weight of the cooling rib, and the thermal diffusivity of the geometry are considered. After assessing the different geometries, a rod rib provided with a bore is selected.

However, as this geometry is associated with considerable expenditure in terms of its production, a tube-shaped rib is simulated, which obtains an even better result. As open geometries cannot be joined by stud welding, a variation of MARC welding must be used. The selected geometry of the tube is optimized with respect to its outer and inner diameter. For cost reasons, only standardized diameters are considered. Optimum results are achieved with a diameter of d=30 mm and a wall thickness of T=5 mm. A further series of simulations and their evaluation returns the result that the cooling rib with a length of l=36 mm yields the best possible result.

The consideration of the material flow shows that there are areas with a higher and a lower particle speed. More ribs should be mounted in the areas with a higher speed than in the area with a lower particle speed due to the more turbulent flow and the additional object of reducing the particle speed. Moreover, the ribs are to arranged in an offset manner. It is achieved by this means that each rib is hit by the material flow. A further positive effect of the selected geometry is the occurrence of eddies of the product behind the rib, whereby the heat transfer is further improved by means of a more turbulent flow. Based on the determined heat transfer coefficients for the different positions under temperatures within the cooler, it can be determined that the ribs have an almost identical positive influence on the transferred heat flow along the cooler.

A listing of the difference in weight as a function of the quantity of installed cooling ribs shows the potential of the optimized tube ribs. The economic optimum is to be determined from the costs of the increased assembly expenditure in relation to the saved material, the weight and further potential savings resulting therefrom with increasing number of cooling ribs. Based thereon a corresponding economic and technical design of the cooler is to be carried out.

What is claimed is:

1. A rotary tube apparatus for cooling or heating flowable granular materials, wherein the apparatus comprises sections, and structures in the form of hollow tubes are arranged in the sections for increasing heat-transferring surface area as well as thermal conduction, the apparatus being subdivided into at least three sections, which sections have a higher density of hollow tubes on radial walls and on a peripheral wall (B, B', B") than in corner areas (A, A', A") between the radial walls and between the radial walls on the one hand and the peripheral wall on the other hand.

2. The apparatus of claim 1, wherein the hollow tubes are arranged in rows extending in a longitudinal direction of the rotary tube.

3. The apparatus of claim 2, wherein two adjacent rows of hollow tubes have an offset arrangement of the hollow tubes.

4. The apparatus of claim 1, wherein the hollow tubes are mounted by a welding process.

5. The apparatus of claim 1, wherein the hollow tubes have a length of less than 10 cm.

6. The apparatus of claim 1, wherein the hollow tubes have a length of less than 5 cm.

7. The apparatus of claim 6, wherein the hollow tubes have a diameter of less than 5 cm.

8. The apparatus of claim 1, wherein the hollow tubes have a diameter of less than 5 cm.

9. The apparatus of claim 1, wherein the hollow tubes have a wall thickness of 1 cm or less.

10. The apparatus of claim 1, wherein the sections respectively comprise approximately 500 ribs or 500 hollow tubes per meter of length of rotary tube.

11. A method of operating the rotary tube apparatus of claim 1, wherein the method comprises causing solid material to move around the hollow tubes in a turbulent flow.

* * * * *